G. W. GRAVES & J. WHITTEMORE.
MACHINE FOR MAKING HOLLOW GLASS ARTICLES.
APPLICATION FILED MAR. 17, 1904.

923,261.

Patented June 1, 1909.
7 SHEETS—SHEET 4.

FIG. 4.

WITNESSES

INVENTORS
GEORGE WILLIAM GRAVES.
JAMES WHITTEMORE.
BY James Whittemore
ATT'Y.

G. W. GRAVES & J. WHITTEMORE.
MACHINE FOR MAKING HOLLOW GLASS ARTICLES.
APPLICATION FILED MAR. 17, 1904.

923,261.

Patented June 1, 1909.
7 SHEETS—SHEET 6.

WITNESSES

INVENTORS
GEORGE·WILLIAM·GRAVES·
JAMES·WHITTEMORE·
BY
ATT'Y.

G. W. GRAVES & J. WHITTEMORE.
MACHINE FOR MAKING HOLLOW GLASS ARTICLES.
APPLICATION FILED MAR. 17, 1904.

923,261.

Patented June 1, 1909.
7 SHEETS—SHEET 7.

WITNESSES

INVENTORS
·GEORGE·WILLIAM·GRAVES·
·JAMES·WHITTEMORE·
BY
ATT'Y.

UNITED STATES PATENT OFFICE.

GEORGE W. GRAVES AND JAMES WHITTEMORE, OF DETROIT, MICHIGAN, ASSIGNORS TO THE TOLEDO GLASS COMPANY, OF TOLEDO, OHIO, A CORPORATION OF OHIO.

MACHINE FOR MAKING HOLLOW GLASS ARTICLES.

No. 923,261.     Specification of Letters Patent.     Patented June 1, 1909.

Application filed March 17, 1904. Serial No. 198,602.

*To all whom it may concern:*

Be it known that we, GEORGE W. GRAVES and JAMES WHITTEMORE, residing at Detroit, in the county of Wayne and State of Michigan, citizens of the United States, have invented certain new and useful Improvements in Machines for Making Hollow Glass Articles, of which the following is a specification, reference being had therein to the accompanying drawings.

The invention relates to an improved machine for making hollow glass articles, and comprises means for gathering the glass into a mold, for shaping the glass into a blank and subsequently blowing the blank.

The invention consists in the construction, arrangement and combination of the various parts, as more fully hereinafter described and as particularly pointed out in the claims.

Figure 7:
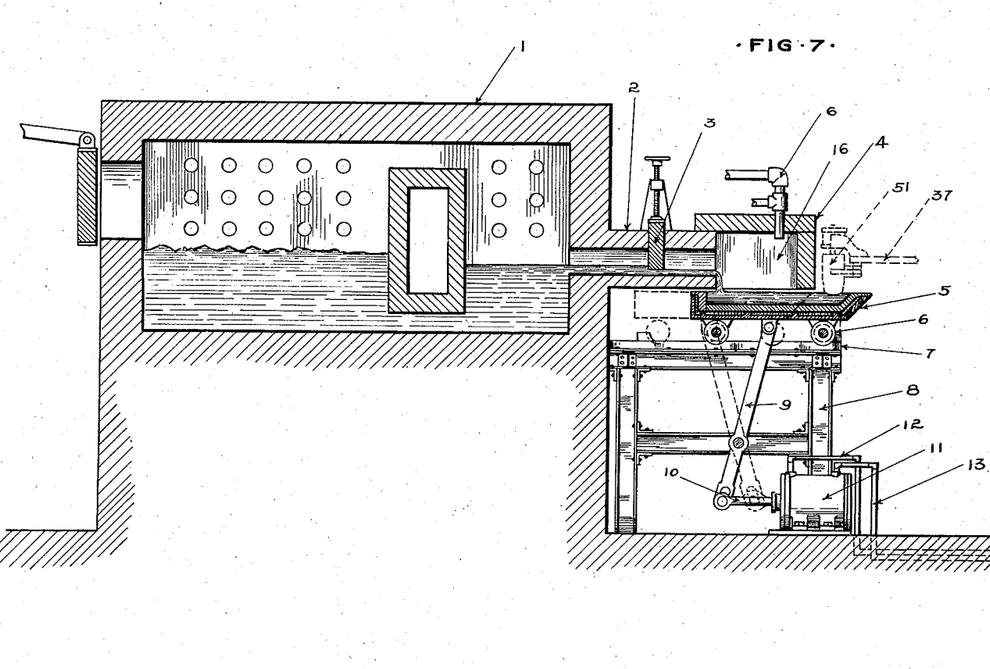
Fig. 7 is a vertical longitudinal section through the tanks.
Figure 8:
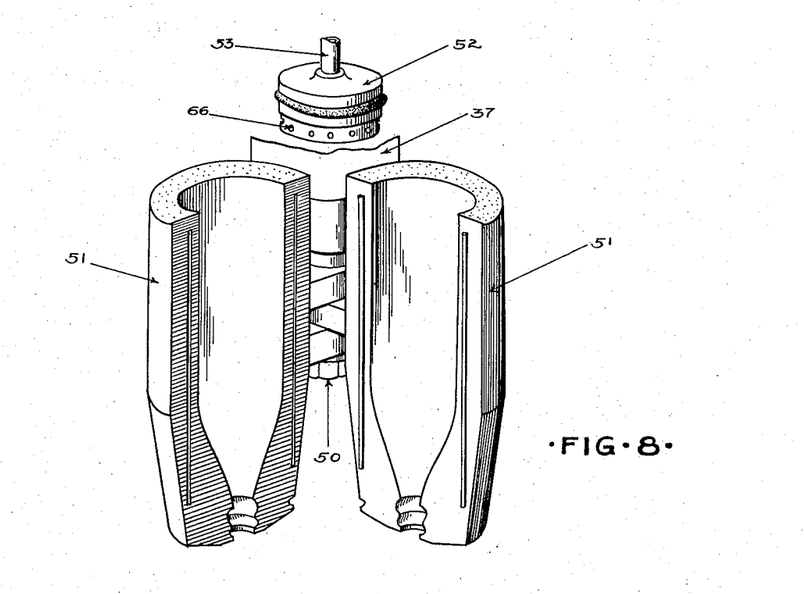
Fig. 8 is a detached perspective view of the mold and its movable bottom detached.
Figure 9:
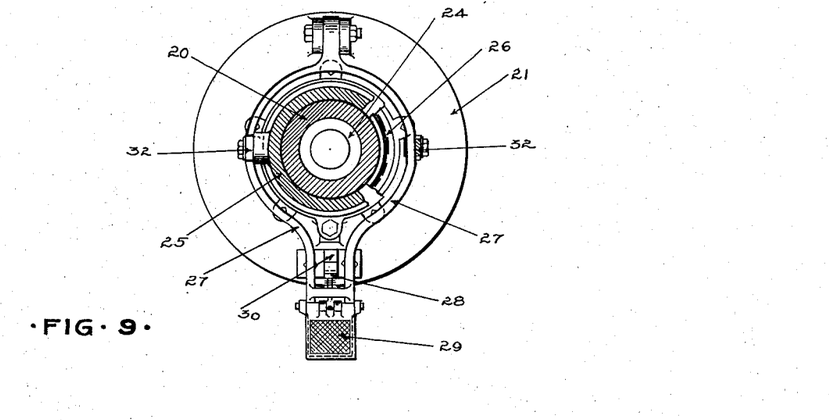
Fig. 9 is a horizontal section on line *x x* Fig. 1.

In Fig. 7 we have shown the tanks for supplying the molten glass for the machine.

1 represents a melting tank of usual construction, having the outlet spout 2 controlled by a valve 3. At the end of the spout is the casing 4, forming within a heating chamber 16 over the movable tank or receptacle 5. We have shown a supply pipe 6 for admitting air and gas to the chamber above the tank 5. The tank 5 is supported on wheels 6 running on rails 7 on a frame 8, and is reciprocated by a lever 9 pivoted in the frame and at its lower end connected to a piston rod 10 which connects to a piston in a cylinder 11. This cylinder is supplied with air or steam under pressure through the pipes 12, 13, leading to opposite ends, and the ends of the cylinder have "bleeds" for exhaust ports, so that by admitting the pressure to the opposite ends of the cylinder the piston is moved back and forth and the tank caused to be moved beneath the casing, or moved with one edge projecting outside thereof as shown in full and dotted lines Fig. 7. The pipes 12 and 13 are controlled by valves, which are shown as having stems 14, 15, which are adapted to be foot operated, the stems having springs for returning them, the springs and details of the valves not being shown.

17 is the steam or air supply pipe to the valve 18.

Figure 1:
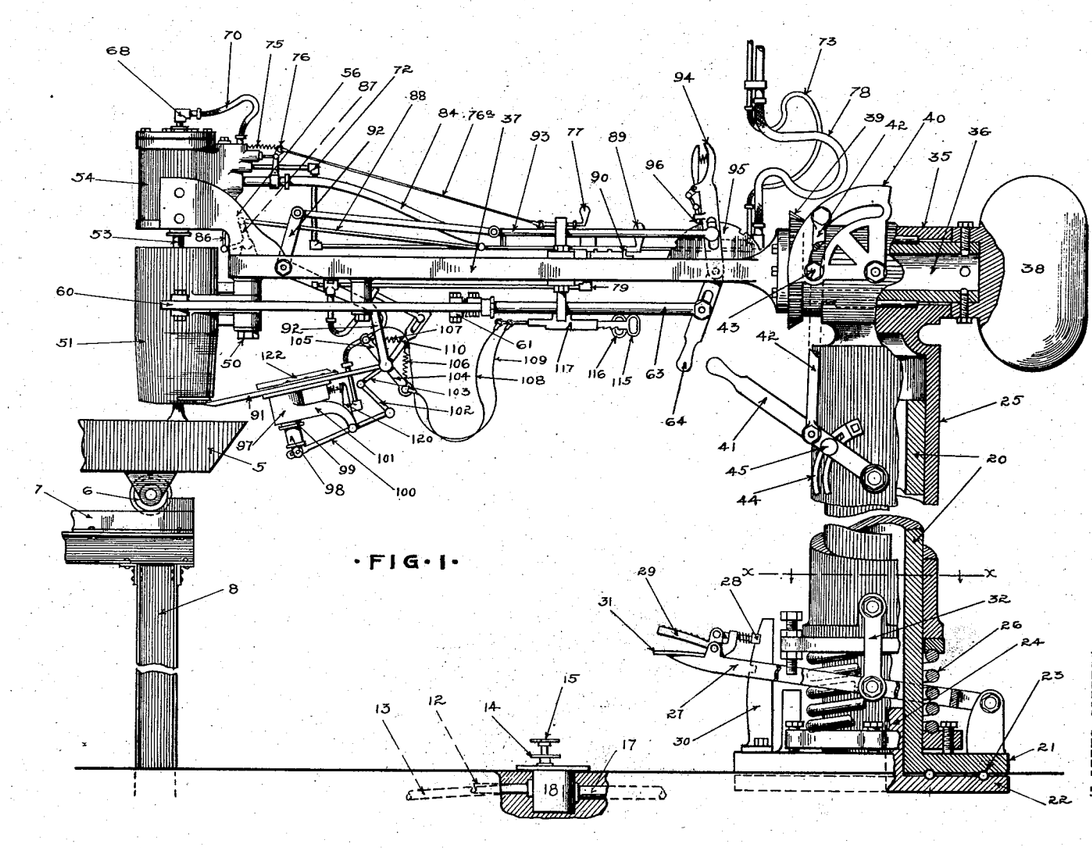
Figure 1 is a side elevation of our improved machine, partly in section, showing the position of parts when the blank has been gathered into the mold.

20 is a post supporting the operating parts of the machine. This post is ordinarily stationary, but to provide means for turning it when necessary, we provide it with the foot 21, resting on the plate 22, with interposed ball bearings 23, the plate 22 having a stub post 24 projecting into the exterior of the post 20, as shown in Fig. 1.

On the post 20 is sleeved the tubular standard 25, which at its lower end rests on the spring 26.

27 is a lever, journaled on the foot 21 of the post 20, embracing the post and having a foot plate 31 for actuating it.

28 is a spring dog actuated by the plate 29, the dog engaging notches in the post 30 to lock the lever in its adjusted positions.

32 are links connecting the lever 27 with the tubular standard 25, so that the standard may be raised or lowered by the lever and spring.

At the top of the standard 25 is the horizontal tubular journal bearing 35, in which is journaled the cylindrical bearing 36 to which is secured the mold arm 37 which carries the mold and the operating parts. At the opposite end of the bearing 36 is secured the counter weight 38 to balance the mold arm.

On the mold arm is the bevel gear wheel 39, with which meshes a bevel gear on the segment 40 pivoted on the side of the journal bearing 35 (Fig. 1). This segment is adapted to be rocked by the lever 41 pivoted to the standard 25, and connected to the segment by a link 42. The segment is shown slotted and through the slot projects a headed stud 43 to guide the segment.

On the standard 25 is a slotted segment 44, and 45 is a clamping bolt passing through the lever and the slot in the segment 44, so that the lever and the mold arm may be locked at the desired points of rotary adjustment of the latter.

At the outer end of the mold arm is the vertical stud 50 on which are journaled the two sections of the mold 51. This mold has three functions, it forms the gathering mold, it forms the blank, and it is also the blowing mold, so that in the claims we shall refer to it according to its function in describing the peculiar novelty of its various functions and structure.

The mold 51 we have shown as having its cavity shaped like a finished beer bottle, the end opposite the neck or the bottom end, being open, and this bottom end being closed by a piston like closure 52 to which is connected the piston rod 53, passing through the head of the cylinder 54, and having the piston 55 thereon. The cylinder is supported on the mold arm by the bracket 56.

The sections of the mold 51 are connected to the levers 60 pivoted on the mold arm, and connected at their inner ends by the toggle levers or links 61 which at their inner ends are connected to a common pivot pin 62 at the end of the rod 63 actuated by the lever 64. The toggle levers or links 61 spring past the center slightly and lock the molds in their closed position. For this purpose these links comprise springs 65 which allow the links to be slightly compressed in passing the center. This is a well known form of toggle hence we do not deem it necessary to describe the details.

The piston rod 53 is hollow, and the piston has the passages 66 leading to an annular groove 67 in the inner face of the piston. On the opposite side of the piston from that to which the piston rod connects is the pipe 68 passing out through the end of the cylinder through a suitable stuffing box 69. This pipe connects to the flexible or hose pipe 70 which connects to the passage 71 formed in an enlargement on the cylinder, and the pipe 72 connects to the outer end of this passage, and is supported on the mold arm, its outer end being connected through the medium of the flexible pipe 73 with an air exhaust apparatus not shown.

74 is a valve in the passage 71 controlling the pipe connections described to the mold cavity. The valve is normally held closed by a spring 75 connecting to the lever 76 which is connected to the valve stem.

76ª is a cord connected to the lever 76 and connecting to a sliding handle 77 on the mold arm within reach of the operator.

When the valve is open the air will be exhausted from the mold cavity through the connections described.

The piston and the movable closure or bottom 52 are controlled by the following devices; on the side of the cylinder is a valve chamber 80, in which is the valve 81 having seats at opposite ends adapted to control the passages 82, 83, leading to the opposite ends of the cylinder. Between the ports leading to passages is the air supply pipe 84, which is connected at its outer end by the flexible pipe 78 to the blowing apparatus, not shown. The cylinder is provided at opposite ends with the bleed passages 85. The valve stem 86 of the valve 81 is connected to a bell crank lever 87 which is connected to the jointed rod 88 sliding in guides on the mold arm, and provided with the notched spring handle 89 (Fig. 1), the notches being adapted to engage with a stop 90 on the mold arm and to hold the valve in its adjusted position.

The cut off and the blowing devices are as follows: 91 is a cut off knife or plate pivotally secured to the lower end of the bell crank lever 92, this lever having connected to its free end the actuating rod 92 actuated by the lever 94 working beside the notched segment 95 with which the hand operated spring detent 96 is adapted to engage, to lock the cut off device at its points of adjustment.

The cut off plate has a lever extension 110 beyond its pivot which has pivoted in a slot in its end the rod 111. This rod passes through guides 112 on the lever 92, and has a collar 113 bearing on the spring 114 which bears at one end against one of the guides 112.

Figure 2:
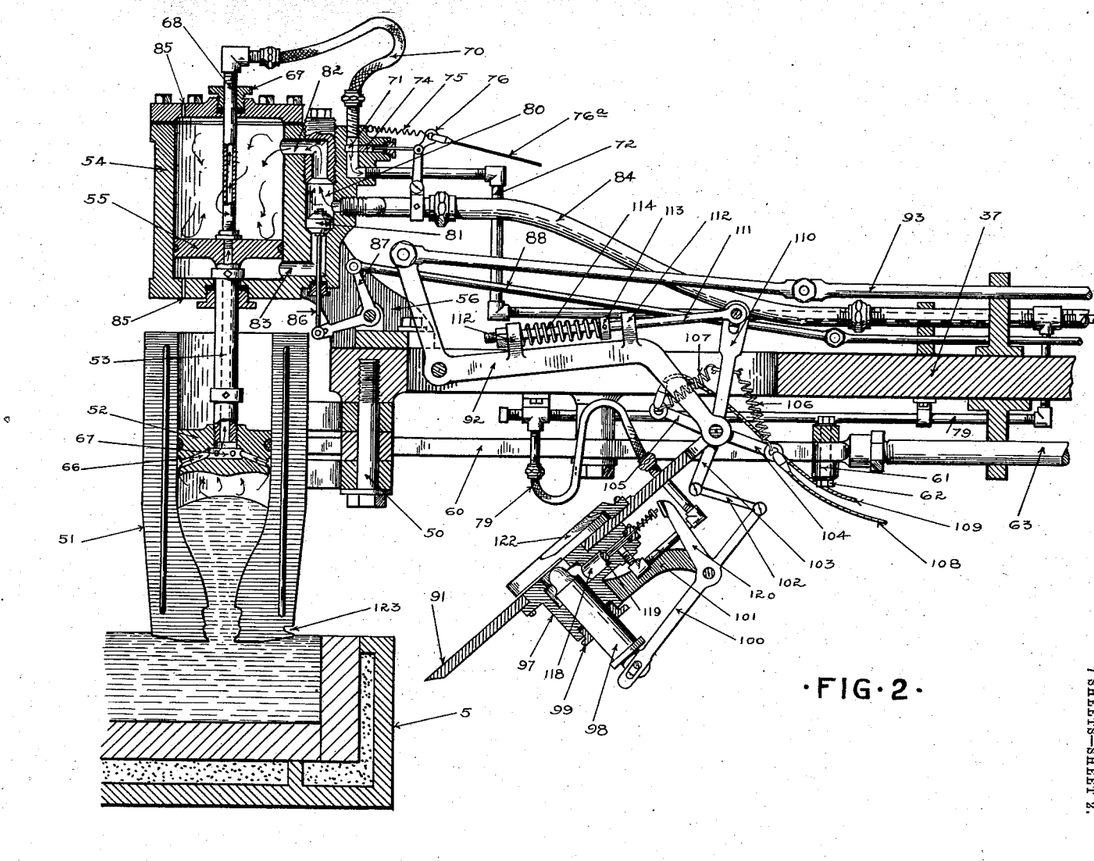
Fig. 2 is a vertical central longitudinal section through the outer end of the mold arm, mold, and cylinder, showing some of the operating parts in elevation, the parts being shown in the gathering position.

Secured to the cut off plate is the blowing head 97 having a passage therethrough in which slidingly engages the pin 98, passing through a stuffing box 99 in the outer end of the head. The pin 98 has connected to it the lever 100, pivoted on the bracket 101 and connected by the link 102 to the lever 103 which has the two actuating arms 104, 105 each actuated in one direction by springs 106, 107, which balance each other to hold the pin normally in the position shown in Fig. 2. The actuating arms 104, 105, are adapted to be moved by the cords 108, 109, which have notched handles 115, 116, sliding in guides 117 on the mold arm, (Fig. 1), the notches serving to hold the handles in their adjusted positions.

Leading into the passage in the blowing head is an air supply passage 118 controlled by the spring closed valve 119 having its stem projecting outside the blowing head. 120 is an arm on the lever 100 adapted to strike the stem of the valve 119 when the pin is drawn, (Fig. 4). 79 is the air supply pipe leading to the spring pressed valve 119 from the pipe 84.

Figure 3:
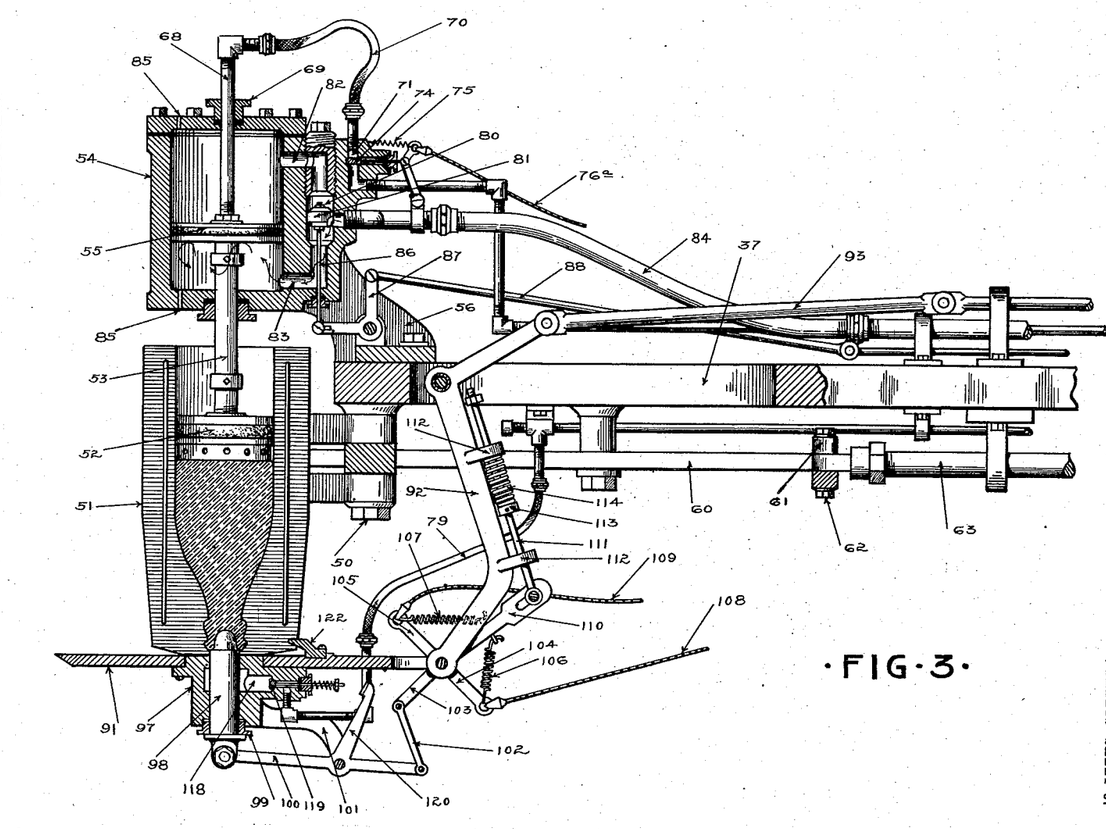
Fig. 3 is a similar view, showing the blank gathered, the cut-off and the pin for making the blowing opening in position.
Figure 4:
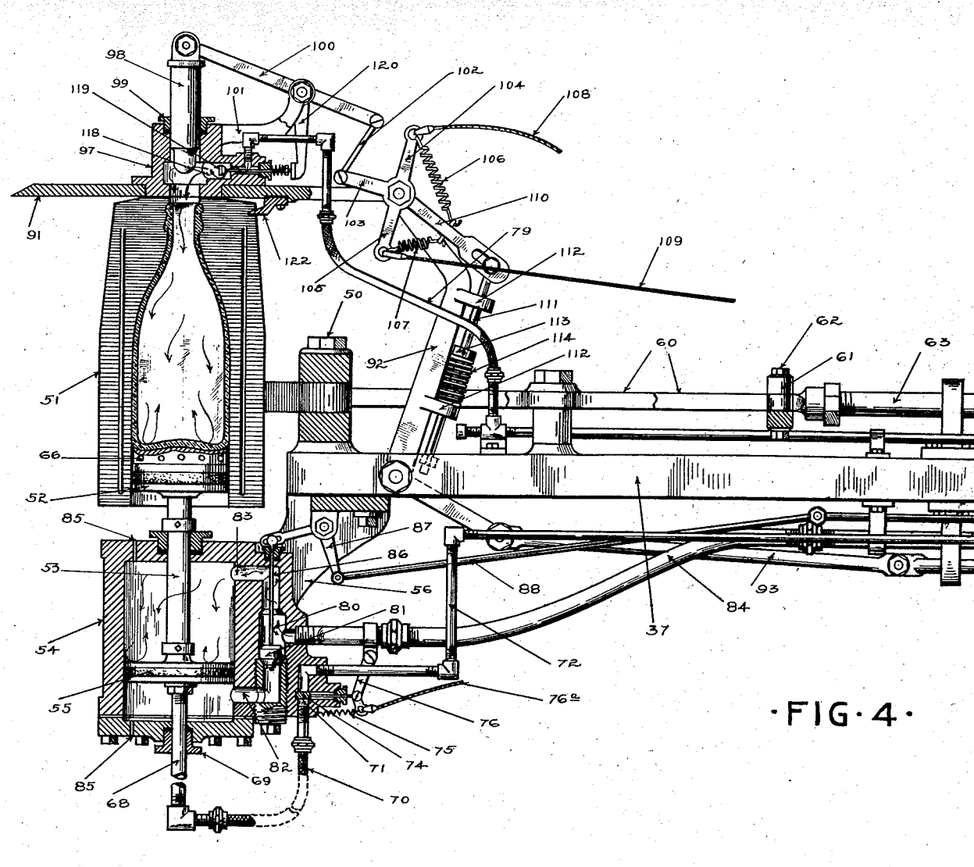
Fig. 4 is a similar view showing the parts inverted and in position for blowing the blank to form.
Figure 5:
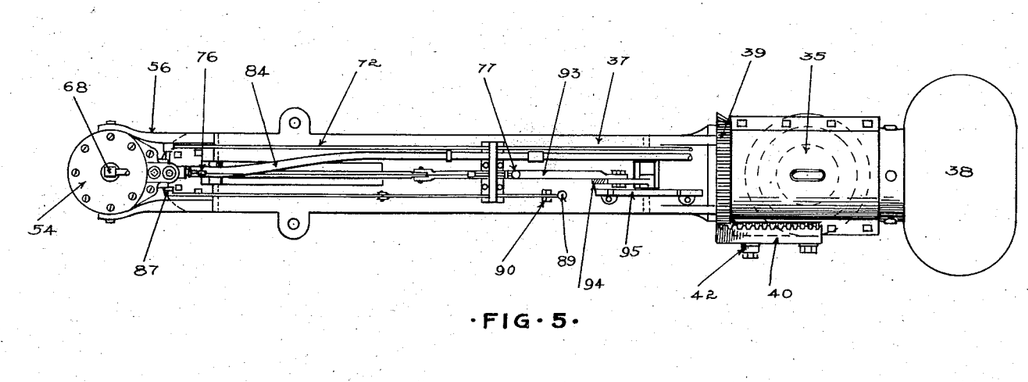
Fig. 5 is a top plan view of the mold arm and associated parts.
Figure 6:
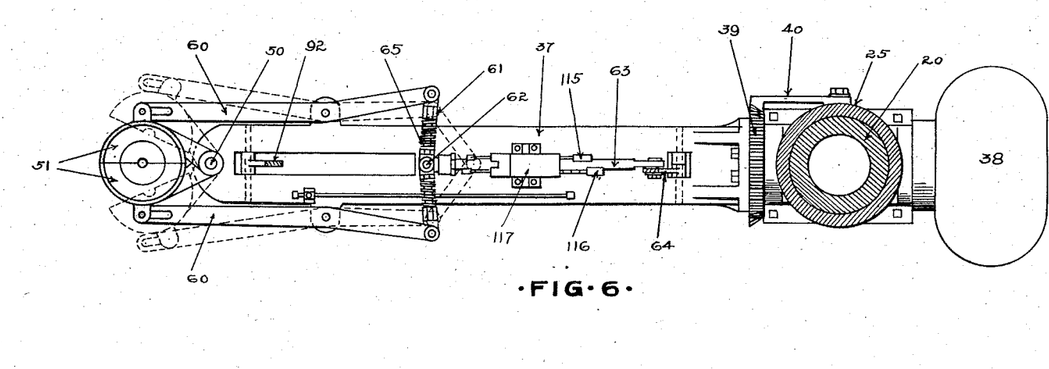
Fig. 6 is a bottom plan view thereof, the post being shown in section.

The parts being thus constructed their operation is as follows: The machine being arranged adjacent to the tank 5, the operator presses the valve 15, which controls air to the pipe 13, the lever 9 is rocked and the tank is moved so that one edge projects outside the casing 4, (Fig. 7). The operator then depresses the lever 27 lowering the mold arm and dipping the neck of the mold into the glass in the tank, (Fig. 2) at the same time pulling the handle 77 opening the valve 74 and exhausting the air from the mold cavity which will cause the glass to flow therein. The valve 81 is in the position shown in Fig. 2, so that the air will be above the piston 55, and the closure of "bottom" 52 will be at the innermost point of its movement. The glass will thus be formed into a blank in that portion of the mold below the closure or bottom 52, which is in effect the blank forming or blank mold. As soon as the glass fills the blank mold, the operator releases the lever 27, the spring 26 raises the mold arm and mold out of the glass, Fig. 1. He then depresses the valve stem 14 which causes the lever 9 to be rocked to the position shown in dotted lines Fig. 7, and withdraws the tank under the casing 4, where the glass, which has been chilled by the dipping will be reheated. The cut-off is then operated by drawing on the lever 94 and moved to the position shown in Fig. 3. To lock the cut-off to the mold tightly, we provide on the cut-off plate the curved lug 122 which, as the cut-off is moved inward engages a recess 123 on the end of the mold and holds the parts against displacement during the subsequent operations. When the cut-off strikes the lower face of the mold (Fig. 1) it is rocked about its pivot and held tightly against the face of the mold by the spring 114, which is compressed in this movement between the collar 113 and the guide lug 112 (Fig. 3). The operator next draws on the handle 116 rocking the lever 100, pushing up the pin 98. Just previous, or at the same time, he should shift the valve 81 to its middle position closing the air inlet pipe, or preferably leaving a very small port open into the passage 83 (Fig. 3) so that a small amount of air will pass beneath the piston 55. This is so that the insertion of the pin 98 into the glass in the mold will be done easily and without necessitating this pin to push up the glass and also the closure or bottom 52, the air admitted under the piston being just sufficient to relieve the closure 52 from the glass in the mold. This movement of the valve 81 is accomplished by moving the spring handle 89 one notch (Fig. 1). The mold arm and mold are now turned to the upright position, Fig. 4, by means of the lever 41, segment 40 and gear wheel 39, and locked by the clamping bolt 45. The article is now to be blown, and this is accomplished by first moving the handle 89 another notch, shifting the valve 81 to close the passage 82 and open the passage 83, as shown in Fig. 4, causing the air to enter above the piston and move down the closure or bottom 52. The operator as nearly as possible at the same time releases the handle 116 and draws on the handle 115, which rocks the lever 100 withdrawing the pin 98, and by its arm 120, opens the air valve 119 admitting air into the blow opening in the blank formed by the pin 98, and as the movable closure or bottom 52 withdraws, blows or expands the bottle in the mold to finished shape, as shown in Fig. 4. The cut-off is then withdrawn, the mold arm and mold reversed, and the mold opened, to drop out the bottle.

What we claim as our invention is:

1. In a glass machine, instrumentalities for gathering and blowing, the same including a mold support, a mold thereon, and means operable while the mold is intact and remains in the machine for gathering, partially filling the mold with a charge of molten glass, shaping the charge into a blank therein, and blowing the blank to complete the article.

2. In a glass-gathering and blowing machine, the combination of a mold support, a blowing mold thereon, supported neck downward, means by which the mold may be charged with glass through the neck, means for cutting off at the neck, means for reversing the mold, and coöperating blowing mechanism adapted to blow the blank to form after the mold has been reversed.

3. In a glass-gathering and blowing machine, the combination of a blowing mold having a movable piston therein adapted to gage the size of the blank, and an open neck portion, means by which the mold may be charged with glass upwardly through the open neck while said mold is in the machine, means for cutting off across the neck, means for reversing the mold, and coöperating means for blowing the blank and simultaneously moving the piston outward.

4. In a glass gathering and blowing machine, the combination of a mold support, a blank mold thereon having a lower open end, means for charging the mold through the lower end, means for reversing the mold, and coöperating means for blowing the blank to form after it is reversed.

5. In a glass-gathering and blowing machine, the combination of a mold support, a blank mold thereon having a lower open end, means for charging the mold through the lower end, means for reversing the mold, cooperating means for making an initial blow opening in the blank, and for blowing the blank to final form.

6. In a machine of the character described, instrumentalities for gathering, forming and blowing the glass including a blank forming mold having a neck portion and a body blank portion, the neck portion being open at its end, and means for exhausting the air from the body portion whereby a charge of glass may be gathered through the neck opening while the mold remains in the machine and in operative association with the blowing means, a pin operatively associated with the mold adapted to be projected into the neck portion.

7. In a machine of the character described, the combination with a bottle blank forming mold having an open ended neck portion, of a cut-off, means whereby the same may be operated across the open end of the neck portion, and means for reversing said mold with said cut-off.

8. In a machine of the character described, instrumentalities for gathering and blowing glass comprising a gathering and blank forming mold having a fill opening through which it may be charged and mounted whereby to be charged while the mold remains in the machine and in operative association with the blowing means, a movable closure for the end of the mold opposite the fill opening shiftable inside of said end, means carried with the mold for making an indentation or blow opening in the blank at the filling end after the mold is charged, and blowing means.

9. In a machine of the character described, a gathering and blank forming mold having an open ended neck portion through which the mold is charged, a cut off, means whereby the cut off is operated independently of the mold whereby to travel across the open end of the neck portion.

10. In a machine of the character described, a blank gathering and forming mold having a charge receiving opening at one end, a movable closure in the opposite end, blowing means, and means for gathering and forming the blank in the mold while the mold remains in operative association with said blowing means, and a pin or stem carried by the mold and adapted to be projected into the fill opening after the mold is charged.

11. The combination of a blowing mold having an open ended neck portion, a movable closure for the body portion, and an exhaust device connecting into the mold cavity through the closure.

12. In a machine of the character described, a gathering and blank forming mold having a fill opening at one end, a movable closure for the other end, means for positively moving said closure to different positions within the mold, and for holding the same in positions of adjustment at points intermediate its extreme limits of movement, and an exhaust connection leading to the mold cavity.

13. In a machine of the character described, a gathering and blank forming mold having a fill opening at one end through which the charge is introduced, an adjustable closure for the other end, and means for retaining the closure in different positions whereby various sizes of charges may be obtained.

14. The combination of a blank forming mold, of a cut-off operating across the fill opening of the mold, and a pin adapted to be projected into the fill opening, carried by the cut-off mechanism.

15. The combination of a blank forming mold, a cut-off operating across the fill opening thereof, and means for locking the cut-off to the bottom of the mold.

16. The combination of a blank forming mold, a cut-off operating across the neck portion thereof, means for locking the cut-off and mold together, and a pin or stem adapted to be projected into the neck of the mold while the cut-off is in its locked position.

17. The combination of a blank forming mold, a knife operating across the neck opening thereof and to be locked to the mold, the knife having an aperture registering with the opening in the neck of the mold, and a pin or stem adapted to be projected through said aperture and into the neck of the mold.

18. The combination of a mold, a cut-off therefor, a pin or stem, means for moving the pin into and withdrawing it from the mold, a valve to control the air for blowing, and means for operating the blowing air valve by the withdrawal of the pin or stem.

19. In a glass gathering and blowing machine, the combination of a bottle mold, means for filling said mold through the neck thereof, a movable closure in the mold, blowing means, and means for withdrawing said closure during the blowing operation.

20. A mold of the character described having an open neck portion, and a movable device at the opposite end of the mold constituting a closure for the end of the mold and also the regulator for the charge, said device having an exhaust passage therein.

21. The combination of a gathering mold, of a cut-off therefor, a movable pin carried thereby, means for moving the pin into the mold to make an initial blow opening, and withdrawing it therefrom, and a valve controlled air supply connection also carried by the cut-off.

22. In a machine of the character described, instrumentalities for gathering and forming the glass comprising a mold, means for mounting the mold whereby it may be charged without removal from the machine, a movable pin adapted to be projected into and withdrawn from the mouth of the mold, an air supply valve, and a common means for actuating the pin and valve.

23. In a machine of the character described, instrumentalities for gathering and forming the glass comprising a mold having an open neck portion, a movable closure in the body portion, means for mounting the mold whereby it may be charged without removal from the machine, a pin adapted to be projected into the neck portion of said mold after it is charged, and means for releasing the holding means for the closure when the pin is inserted.

24. In a machine of the character described, means for gathering and forming glass comprising a support, a mold thereon, means whereby glass is gathered into and partially fills said mold to form the blank without detaching the mold from its support or removing the same from operative association with the blowing means, and means for blowing the blank without separating the sections of the mold.

25. The combination with a mold having means for exhausting air therefrom, means for raising and lowering said mold, coöperating tank into which said mold is adapted to be dipped when lowered, and means for moving said tank laterally to and from the dipping point of the mold.

26. The combination of a raising and lowering glass dipping mechanism, of a tank for the molten glass and means for moving said tank laterally to and from the dipping point of the mold.

27. The combination of a raising and lowering glass dipping mechanism, of a movable tank, a heating chamber over the same, means for moving said tank so that the dipping mechanism may dip therein outside the chamber, and for withdrawing the tank within the chamber and reheating the glass at the dipping point.

28. In a glass-gathering and blowing machine, the combination of a mold of a size and shape to gather a blank of sufficient glass to make an article, means for charging the mold with molten glass, a movable closure in said mold, means moving said closure to enlarge the mold cavity, and blowing means.

In testimony whereof we affix our signatures in presence of two witnesses.

GEORGE W. GRAVES.
JAMES WHITTEMORE.

Witnesses:
H. C. SMITH,
JAS. P. BARRY.